(12) United States Patent
Bruccoleri et al.

(10) Patent No.: US 11,254,830 B2
(45) Date of Patent: Feb. 22, 2022

(54) ACTINIC RADIATION CURABLE COMPOSITIONS INCLUDING SEMICONDUCTOR METAL OXIDE MATERIALS

(71) Applicant: SUN CHEMICAL CORPORATION, Parsippany, NJ (US)

(72) Inventors: Aldo G. Bruccoleri, Calgary (CA); Juanita M. Parris, Montvale, NJ (US); Richard R. Durand, Jr., Oradell, NJ (US); Terry Best, Newark, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 17/048,472

(22) PCT Filed: Jan. 9, 2019

(86) PCT No.: PCT/US2019/012849
§ 371 (c)(1),
(2) Date: Oct. 16, 2020

(87) PCT Pub. No.: WO2019/216961
PCT Pub. Date: Nov. 14, 2019

(65) Prior Publication Data
US 2021/0087421 A1    Mar. 25, 2021

Related U.S. Application Data

(60) Provisional application No. 62/669,533, filed on May 10, 2018, provisional application No. 62/740,996, filed on Oct. 4, 2018.

(51) Int. Cl.
| | | |
|---|---|---|
| *C09D 11/52* | (2014.01) | |
| *B05D 3/06* | (2006.01) | |
| *B41M 7/00* | (2006.01) | |
| *C08K 3/04* | (2006.01) | |
| *C08K 3/22* | (2006.01) | |
| *C08K 3/34* | (2006.01) | |
| *C09D 4/00* | (2006.01) | |
| *C09D 11/101* | (2014.01) | |

(52) U.S. Cl.
CPC ............ *C09D 11/52* (2013.01); *B05D 3/067* (2013.01); *B41M 7/0081* (2013.01); *C08K 3/04* (2013.01); *C08K 3/22* (2013.01); *C08K 3/346* (2013.01); *C09D 4/00* (2013.01); *C09D 11/101* (2013.01); *C08K 2003/222* (2013.01); *C08K 2003/2241* (2013.01); *C08K 2003/2296* (2013.01)

(58) Field of Classification Search
None
See application file for complete search history.

(56) References Cited

U.S. PATENT DOCUMENTS

| | | |
|---|---|---|
| 3,041,172 A | 6/1962 | Evans et al. |
| 3,083,113 A | 3/1963 | Korf |
| 3,147,119 A | 9/1964 | Evans et al. |
| 3,346,383 A | 10/1967 | Baxendale et al. |
| 4,257,915 A | 3/1981 | Baxendale et al. |
| 4,959,297 A | 9/1990 | Palazzotto |
| 5,212,212 A | 5/1993 | Fonda |
| 6,267,949 B1 | 7/2001 | Halls |
| 6,433,038 B1 | 8/2002 | Tanabe et al. |
| 8,512,467 B2 | 8/2013 | Burgard |
| 8,623,220 B2 | 1/2014 | Bagabas et al. |
| 2005/0153068 A1 | 7/2005 | Li |
| 2007/0259986 A1 | 11/2007 | Elwakil et al. |
| 2008/0306201 A1 | 12/2008 | Beltrame |
| 2009/0286002 A1 | 11/2009 | Iezzi |
| 2010/0074837 A1 | 3/2010 | Shio et al. |
| 2010/0330297 A1 | 12/2010 | Walters |
| 2012/0177928 A1 | 7/2012 | You |
| 2013/0108798 A1 | 5/2013 | Bowman |
| 2014/0183141 A1 | 7/2014 | Kurup |
| 2017/0216821 A1 | 8/2017 | Kurup |

FOREIGN PATENT DOCUMENTS

| | | |
|---|---|---|
| CN | 104 877 446 A | 9/2015 |
| EP | 2 368 919 A1 | 9/2011 |
| JP | S52-034714 A | 3/1977 |
| JP | H02-000972 A | 1/1990 |
| JP | H08-283453 A | 10/1996 |

(Continued)

OTHER PUBLICATIONS

International Search Report issued in International Application No. PCT/US19/12849, dated Mar. 26, 2019.
Written Opinion of the International Searching Authority issued in International Application No. PCT/US19/12849, dated Mar. 26, 2019.
International Preliminary Report on Patentability (Chapter 1 of the Patent Cooperation Treaty) issued in International Application No. PCT/US19/12849, dated Jul. 24, 2020.
Danu S, Darsono, Marsongko. UV-curing of titanium dioxide pigmented epoxy acrylate coating on ceramic tiles. Journal of the Ceramic Society of Japan 2008:116(1356):896-903.
J. A. Burunkova, I. Yu. Denisyuk, and S. A. Semina, "Self-Organization of ZnO Nanoparticles on UV-Curable Acrylate Nanocomposites," Journal of Nanotechnology, vol. 2011, Article ID 951036, 6 pages, 2011. doi: 10.1155/2011/951036.

(Continued)

*Primary Examiner* — Robert T Butcher
(74) *Attorney, Agent, or Firm* — Marian E. Fundytus; Ostrolenk Faber LLP.

(57) ABSTRACT

Described herein are inks and coating compositions comprising semiconductor metal oxides and composites thereof, which are natural environmentally sustainable materials that may be recycled and/or reused indefinitely. Semiconductor metal oxides offer an alternative to relatively more toxic, non-sustainable, photo and heat-degrading, migrating traditional photoinitiator agents used in actinic radiation curable compositions. The semiconductor metal oxides and composites thereof absorb visible or UV-light as photocatalysts and/or semiconductors, or absorb electron beam radiation, forming radicals for radical events as polymerization reactions and color enhancement events.

26 Claims, 1 Drawing Sheet

(56) References Cited

FOREIGN PATENT DOCUMENTS

| | | |
|---|---|---|
| JP | H10-186426 A | 7/1998 |
| JP | 2003-096119 A | 4/2003 |
| JP | 2007-231178 A | 9/2007 |
| JP | 2017-115434 A | 6/2017 |
| WO | WO 2011/116972 | 9/2011 |
| WO | WO 2017/180496 A1 | 10/2017 |
| WO | WO 2017/182638 A1 | 10/2017 |

OTHER PUBLICATIONS

Trouillas, P, et al., (2016). Stabilizing and modulating color by copigmentation: Insights from theory and experiment. Chem. Rev., 11;116(9):4937-82.

Azan V, Lecamp L, Lebaudy P, Bunel C., Simulation of the Photopolymerization Gradient Inside a Pigmented Coating—Influence of TiO2 Concentration on the Gradient; Prog Org Coat 2007:58(1):70-75.

Nakayama, N. & Hayashi, T. Preparation and characterization of TiO2—ZrO2 and thiol-acrylate resin nanocomposites with high refractive index via UV-induced crosslinking polymerization. Compos. Part A 38, 1996-2004 (2007).

Supplementary EP Search Report issued in counterpart EP application No. 19 80 0206, dated Jun. 18, 2021.

Japanese Office Action issued in counterpart JP application No. 2020561889, dated Apr. 21, 2021 with English language summary thereof.

JP Office Action issued in counterpart JP application No. 2020-561889, dated Oct. 19, 2021 with English language summary thereof.

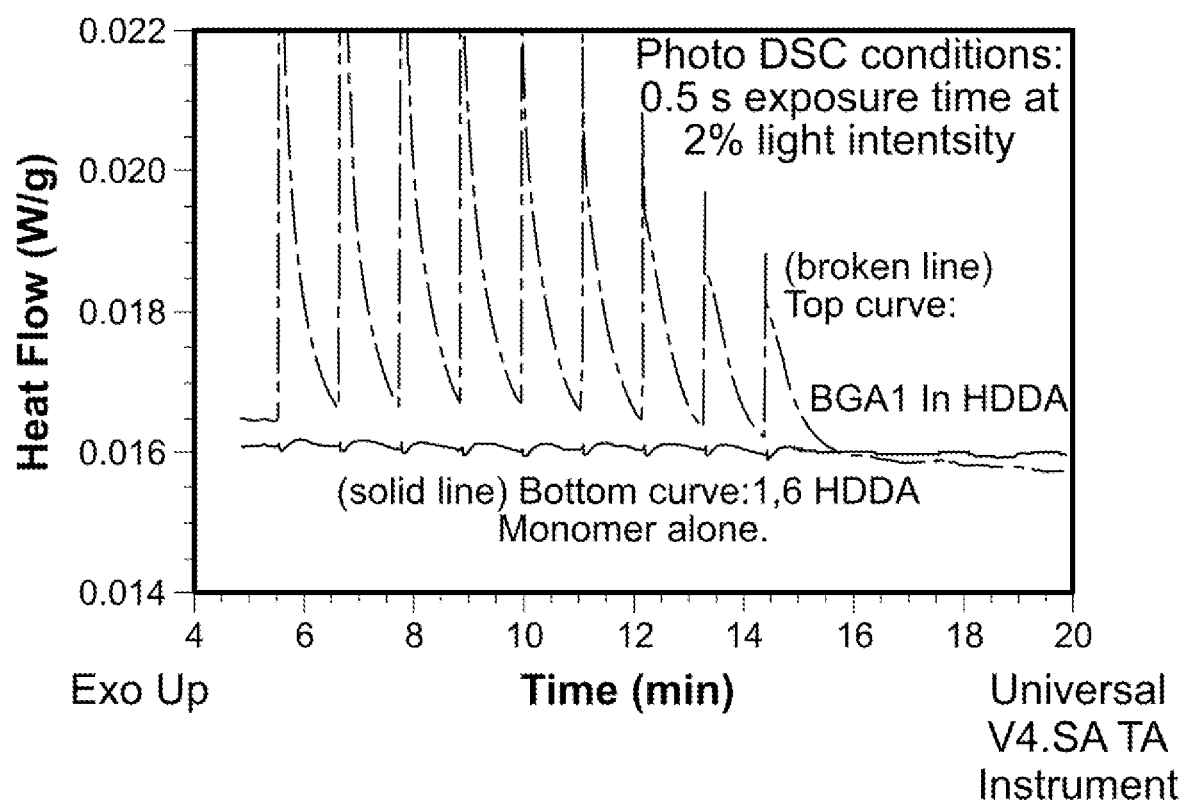

ACTINIC RADIATION CURABLE COMPOSITIONS INCLUDING SEMICONDUCTOR METAL OXIDE MATERIALS

CROSS REFERENCE TO RELATED APPLICATIONS

The present application is a § 371 National Phase application based on PCT/US19/12849 filed Jan. 9, 2020, which claims the benefit of U.S. Provisional Application Nos. 62/669,533, filed May 10, 2018 and 62/740,996, filed Oct. 4, 2018 the subject matter of each of which is incorporated by reference in their entirety.

FIELD OF THE INVENTION

The present invention is directed to actinic radiation curable compositions which undergo free radical polymerizations upon exposure to actinic radiation, such as the emission of a UV light source. The compositions include semiconductor metal oxide materials that initiate curing and improve the color of the compositions. The semiconductor metal oxide materials may provide a replacement for all or part of the photoinitiator materials that may be present in actinic radiation curable compositions.

BACKGROUND

Actinic radiation curable compositions, such as inks, primers, coatings and adhesives, are commonly employed in printing operations such as flexo, gravure, digital, among others. Such compositions include polymerizable materials, such as ethylenically unsaturated monomers and oligomers, photoinitiators, colorants, inhibitors, waxes, etc. The compositions undergo curing when exposed to actinic radiation. The curing involves a free radical polymerization of the ethylenically unsaturated monomers and oligomers present in the compositions. The photoinitiators start a polymerization reaction when the composition is exposed to a reaction-starting dose of actinic radiation. The actinic radiation is emitted by an actinic light source, such as for example UV-light, which can be provided by a high- or medium-voltage mercury bulbs, a xenon bulb, a carbon arc lamp, a metal halide bulb, a LED light source (i.e., UV-LED lamp) and/or visible light, such as sunlight. Electron beam radiation may also be used to initiate curing of such compositions, in which case the compositions do not have to include photoinitiators.

One of the problems that arise from the inclusion of photoinitiators in actinic radiation curable compositions is that after printing the compositions onto substrates such as food packaging and then curing same, photoinitiator residues may migrate out of the compositions over time. Migratable residues may contaminate the goods packaged within the printed packaging, which is particularly problematic if the goods are foods, medicines, and the like. Further, migratable components may contaminate the environment outside of the packaging. Many photoinitiators are classified as toxic materials, and thus they cannot be included in compositions printed on items that come in direct contact with food.

While high energy electron beam (E-beam or EB) curing may not require the presence of a photoinitiator, this curing method may not provide full and complete curing of ethylenically unsaturated monomers and oligomers. Thus, E-beam curing does not solve the problem of migratables.

It would be advantageous and beneficial to provide actinic radiation curable compositions that are more eco-friendly, renewable, and environmentally sustainable.

References that may be of interest include:
U.S. Pat. Nos. 3,083,113, 4,959,297, 5,212,212, 6,267,949, 8,512,467 and 8,623,220; U.S. Patent Appl. Publ. Nos. 2005/0153068, 2007/0259986, 2008/0306201, 2010/0074837, 2012/0177928, 2014/0183141 and 2017/0216821; WO 2011/116972 and EP 2 368 919 A1;

The following non-patent literature documents:
Azan V, Lecamp L, Lebaudy P, Bunel C., *Simulation of the Photopolymerization Gradient Inside a Pigmented Coating—Influence of $TiO_2$ Concentration on the Gradient*; Prog Org Coat 2007:58(1):70-75;
Danu S, Darsono, Marsongko, *UV-Curing of Titanium Dioxide Pigmented Epoxy Acrylate Coating on Ceramic Tiles*; Journal of the Ceramic Society of Japan 2008:116(1356): 896-903;
J. A. Burunkova, I. Yu. Denisyuk, and S. A. Semina, *Self-Organization of ZnO Nanoparticles on UV-Curable Acrylate Nanocomposites*; Journal of Nanotechnology, vol. 2011, Article ID 951036, 6 pages, 2011. doi:10.1155/2011/951036;
Nakayama, N. & Hayashi, T., *Preparation and Characterization of $TiO—ZrO_2$ and Thiol-Acrylate Resin Nanocomposites with High Refractive Index via UV-Induced Crosslinking Polymerization*; Compos. Part A 38, 1996-2004 (2007);
Trouillas, P, et al., (2016), *Stabilizing and Modulating Color by Copigmentation: Insights from Theory and Experiment*; Chem. Rev., 11; 116(9):4937-82.

SUMMARY OF THE INVENTION

Described herein are actinic radiation curable compositions, such as inks and coatings that are curable by exposure to actinic radiation. The compositions comprise a polymerizable component selected from an ethylenically unsaturated monomer, an ethylenically unsaturated prepolymer, and combinations thereof; and a semiconductor metal oxide material, optionally present as a composite comprising the semiconductor metal oxide material and another composite forming material.

In one aspect, wherein the semiconductor metal oxide is as defined in formula (I):

$$M_xO_yH_z \qquad (I)$$

wherein M is a metal selected from Ti, Zn, Mg, Ce, Bi, and Fe;
O is oxygen;
H is a halogen;
x is an integer of 1 to 3;
y is an integer of 1 to 3; and
z is an integer of 0 to 3.

Combinations of metal oxides as defined in formula (I) may be used.

In one aspect, the semiconductor metal oxide material is present as a composite of the semiconductor metal oxide material and another composite forming material selected from pigments, clays, humic acid, humic acid polymers, and photoactive substances that are capable of responding to light or electromagnetic radiation, such as optical brighteners and photoinitiators.

In one aspect, the semiconductor metal oxide semiconductor metal oxide material is present as a composite of the semiconductor metal oxide material and a pigment selected from carbon black, halloysite clays, aluminosilicate clays, magenta pigments such as lithol rubine pigments, and combinations thereof.

In one aspect, the semiconductor metal oxide material is present as a composite of the semiconductor metal oxide material and another composite forming material selected from carbon black, aluminosilicate clays and combinations thereof.

In one aspect, the polymerizable component comprises an ethylenically unsaturated material selected from one or more of an ethylenically unsaturated monomer and an ethylenically unsaturated prepolymer.

In one aspect, the ethylenically unsaturated prepolymer of the polymerizable component is selected from epoxyacrylates, acrylated oils, urethane acrylates, polyester acrylates, polyether acrylates, vinyl/acrylic oligomers, polyene/thiol systems, and combinations thereof.

In one aspect, the actinic radiation curable compositions further comprise one or more photoinitiators.

In one aspect, the actinic radiation curable compositions include photoinitiators in lesser amounts than the amounts that are included in actinic radiation curable compositions that do not include the semiconductor metal oxide materials described herein.

In one aspect, the actinic radiation curable compositions exhibit improved color when compared to actinic radiation curable compositions that do not include the semiconductor metal oxide materials described herein.

In one aspect, actinic radiation curable compositions are curable by exposure to sources of actinic radiation, such as, for example, visible light, such as sunlight, and UV-light. The UV-light for curing may be provided by one or more of a high-voltage mercury bulb, a medium-voltage mercury bulb, a xenon bulb, a carbon arc lamp, a metal halide bulb, and a UV-LED light source.

In one aspect, the actinic radiation curable compositions are inks and coatings suitable for application by process such as, for example, lithographic, flexographic, gravure, screen, spray, rod, spray, curtain coater and digital.

As used in the present application the "semiconductor metal oxide" is a material that, in the presence of a polymerizable, ethylenically unsaturated component and when exposed to a reaction-starting dose of actinic radiation, creates a free radical polymerization reaction pathway in the polymerizable, ethylenically unsaturated component, the creation of the pathway being solely attributable to the metal oxide, and without loss of the semiconductor metal oxide during the photopolymerization process. The activity is catalytic in that the metal oxide composite is not consumed and does not undergo an irreversible chemical change and is available to assist with additional radical reactions.

The initiation of a free radical polymerization reaction in the polymerizable, ethylenically unsaturated component by the semiconductor metal oxide and which is solely attributable thereto can be demonstrated by a Differential Scanning calorimetry (DSC) plot of heat flow vs. time generated for a reaction system that has been exposed to a reaction-starting dose of actinic radiation, wherein the reaction system includes an ethylenically unsaturated material and a semiconductor metal oxide material and whereby the system is free of photoinitiators (i.e., not including photoinitiators), wherein the DSC plot shows the generation of heat (i.e., heat flow) indicative of a free radical polymerization reaction that is or has taken place in the system.

Photo DSCs are acquired using a TA DSC Q2000 w/TA PCA (Photocalorimeter Accessory) Accessory w/012-64000 Hg Lamp. The pans used are T Zero Aluminum pans with one bare pan as the reference pan and a sample pan that contains between 10-15 mg of either the non-photoreactive or photoreactive system. The sample and reference pans are irradiated with light for 0.5 seconds to 2 seconds with the remainder of a 60 second interval being well time over the course of 10 total irradiation cycles. The lamp intensity may be set for 1% to 5% (2.0 W to 10 W) and at a temperature of 25° C. (isothermal). The PCA Accessory contains a 200 W Hg High Vapor Pressure Lamp with a spectral output of 320 to 500 nm. To evaluate the photoactivity of a BGA, the enthalpy (J/g) of the system per cycle compared to a baseline monomer system was considered. In this case, monomers serve as the baseline and monomer blended with BGA as the photoreactive system.

An Example of a DSC plot is provided herewith as the FIGURE and demonstrates enhanced curing activity for a composite of a semiconductor $TiO_2$ metal oxide and carbon black (BGA1) in 1,6-hexanediol diacrylate without a photoinitiator being present. The activity is catalytic in that the metal oxide composite is not consumed and does not undergo an irreversible chemical change and is available to assist with additional radical reactions.

The above definition does not exclude the inventive actinic radiation curable compositions described herein that include semiconductor metal oxide materials and one or more photoinitiators. In such compositions, the photoinitiators initiate curing upon actinic radiation exposure.

It has been found that actinic radiation curable compositions, optionally including photoinitiators, and semiconductor metal oxides undergo a more complete and thorough cure than compositions that contain only photoinitiators. Also, compositions including photoinitiators and semiconductor metal oxides exhibit improved color properties after curing. Such properties include improved color appearance, density, and gloss, which improvements are measurable. The cure and color improvements are demonstrated in the examples that follow.

As best understood, and not wishing to be bound by any theory, reaction pathway creation as mentioned in the above definition is not the initiation of a free radical polymerization in the manner that organic photoinitiators initiate free radical photopolymerization.

It should further be understood that the actinic radiation curable composition described herein can be cured by energy from an electron beam apparatus (E-beam). In such instances, photoinitiator components may not be present in the compositions. As shown in the examples that follow, inks and coatings that include the semiconductor metal oxides exhibit improved curing when they include the semiconductor metal oxides.

The described actinic radiation curable inks and coating compositions are more environmentally friendly than compositions that rely solely on photoinitiator to initiate curing. The semiconductor metal oxide materials contained in the inks and coating compositions operate according to green-technology principles (e.g., photocatalysis and radiation enhancement). The semiconductor metal oxide materials (considered to be metal oxide semiconductor materials) are renewable and sustainable. By including the semiconductor metal oxide materials (and composites thereof) in the actinic radiation curable compositions, the amounts and concentrations of traditional photoinitiators can be reduced.

BRIEF DESCRIPTION OF THE DRAWINGS

The FIGURE is a Photo-DSC spectrum demonstrating photocatalytic activity of a composite of a semiconductor TiO$_2$ metal oxide and carbon black (BGA1) in a reaction system containing the composite, 1,6-hexanediol diacrylate (HDDA) monomer, and no photoinitiator. On exposure to UV-energy, a polymerization reaction is initiated in the HDDA. The photocatalytic activity is attributable to the composite since no photoinitiator is present in the reaction system. The FIGURE also shows that that there is no photocatalytic activity in a system that contains only HDDA. Exposure conditions: UV-energy emitted at 0.5 second exposure time and at 2% light intensity.

DETAILED DESCRIPTION OF THE INVENTION

As used herein, the term "ethoxylated" refers to chain extended compounds that include ethylene oxide as the chain extender.

"Propoxylated" refers to chain extended compounds that include propylene oxide as the chain extender.

"Alkoxylated" refers to chain extended compounds that include ethylene oxide and propylene oxide as chain extenders.

A "prepolymer" is an oligomer or other macromolecule that is capable of further polymerization.

The actinic radiation curable inks and coatings include semiconductor metal oxide materials that are solid species capable of non-covalent, self-assembly interactions and are less likely to migrate out of the cured compositions than traditional molecular photoinitiators and their residues. Further, supramolecular complexes form between semiconductor metal oxide materials themselves and with a variety of hydrophobic or hydrophilic species.

Semiconductor metal oxide material form excited state electron-hole pairs (excitons) exhibiting quantum confinement properties affecting excited state electron hole pairs. It is well known that this property varies from semiconductor to semiconductor and is influenced by the treatments performed on semiconductor metal oxides. An exciton is a bound state of an electron and an electron hole that are attracted to each other by the electrostatic Coulomb force. Excitons form upon radiation absorption by the semiconductor metal oxide material. It is an electrically neutral quasiparticle that exists in insulators, semiconductor metal oxide materials and in some liquids. The exciton is regarded as an elementary excitation of condensed matter that can transport energy without transporting net electric charge. Excitons form when a photon is absorbed by a semiconductor material, such as the semiconductor metal oxide materials (and composites thereof) that are used herein. A photon excites an electron from the valence band into the conduction band in the semiconductor. In turn, this leaves behind a positively charged electron hole (an abstraction for the location from which an electron was moved). The electron in the conduction band is then effectively attracted to this localized hole by the repulsive Coulomb forces from large numbers of electrons surrounding the hole and excited electron. This attraction provides a stabilizing energy balance. Consequently, the exciton has slightly less energy than the unbound electron and hole. The wave function of the bound state is said to be 'hydrogenic', an exotic atom state akin to that of a hydrogen atom (except for the zero rest mass of the hole). The binding energy is much smaller and particle size is much larger than a hydrogen atom. This is because of both the screening of the Coulomb force by other electrons in the semiconductor (i.e., its dielectric constant), and the small effective masses of the excited electron and hole. The recombination of the electron and hole, i.e. the decay of the exciton, is limited by resonance stabilization due to the overlap of the electron and hole wave functions, resulting in an extended lifetime for the exciton.

The lifetimes of photogenerated electrons and holes (reductive/oxidative centers) are increased. In the case of actinic radiation curable compositions, the possibility exists for exchange between the semiconductor metal oxide radical species and charge with monomer acrylates near the photocatalyst surface. These photo-induced events initiate photochemical curing reactions. The occurrence of interfacial electron transfer, i.e., transfer of an electron to or from a substrate adsorbed onto the light-activated semiconductor takes place in photocatalytic processes, and the efficiency thereof effects the ability of the semiconductor to serve as a photocatalyst for a given redox reaction. The efficiency of electron transfer reactions is, in turn, a function of the position of the semiconductor's conduction and valence band-edges relative to the redox potentials of the adsorbed acrylate monomer moieties.

Advantageously and beneficially, the described actinic radiation curable compositions are more eco-friendly, renewable and environmentally sustainable than traditional photoinitiators used to initiate photo-polymerization. The actinic radiation curable compositions include lower concentrations of relatively toxic traditional photoinitiators and provide a lessened possibility of the migration of partially-reacted monomers/oligomers and photoinitiators into surrounding environment and materials.

The semiconductor metal oxide materials and composites thereof described herein initiate photocatalytic curing in the ethylenically unsaturated materials included in the described actinic radiation curable compositions. Further, it has been found that the inclusion to the semiconductor metal oxide materials results in the enhancement of color in the compositions. Thus, they further act as color enhancing agents. By including the semiconductor metal oxide materials, a lesser amount of photoinitiator material may be included in the compositions when compared to the amount of photoinitiator material included in compositions that do not include the semiconductor metal oxide materials and composites thereof. As a result thereof, the amount of potential migratable components, which may include toxic byproducts, is reduced. The complexes that form are stable, ecofriendly and offer facile molecular-architecture modification towards a many different sophisticated supramolecular composites with varying UV absorbance activity and functionality (nanotechnology). Composites include complexes with natural carbon black moieties and oxidized natural humic acid polymers.

The semiconductor metal oxide materials are semiconductor materials that do not degrade in performing as initiators of curing events upon exposure to actinic radiation since they act as catalysts during curing and do not act as reactants.

Further, government regulations have indirectly initiated efforts to find more environmentally friendly and safer alternatives to the inclusion of photoinitiators in actinic radiation curable compositions. The described actinically curable inks and coating compositions provide eco-friendly and safer alternatives to photoinitiators, since the amounts of photoinitiators can be eliminated or lessened in the actinically curable composition.

The above-mentioned color-improving property of the semiconductor metal oxide materials is a new and unexpected property not exhibited by traditional photoinitiators.

The semiconductor metal oxide materials and composites are superior to traditional photoinitiators for reasons including: they do not degrade over time (typical photoinitiators are relatively unstable and have shorter shelf-lives under varying conditions of temperature and oxygen) and are not known to form toxic side products upon exposure to UV light energy.

In addition, composites of the semiconductor metal oxide materials included in the presently described actinic radiation curable compositions can readily incorporate other components that aid in improving the cure and the color of the compositions. One benefit of a composite is that it may attract and bind reactive ethylenically unsaturated materials such as acrylate monomers to the reaction surface of the semiconductor metal oxide through non-covalent interactions. This could take place with composites of semiconductor metal oxide and carbon black. One such composite is BGA1—a composite of semiconductor $TiO_2$ metal oxide and carbon black, described in the examples that follow.

Unlike traditional photoinitiators, the UV absorbance band of the semiconductor metal oxide materials used in the present actinic radiation curable composition can be adjusted towards desired wavelengths of the UV spectrum, thereby improving the curing activity in the compositions when exposed to curing energy. In addition, because of the dual concurrent photo-induced oxidation/reduction actions at the surface of semiconductor metal oxide material-based composites, the composites may be used in antimicrobial/anti-odor applications (oxidation/reduction of microbes); multiple free radical generation during curing; photovoltaic applications; and/or water remediation.

The semiconductor metal oxide materials and composites thereof are environmentally sustainable materials and may also be repurposed from used materials and be reused indefinitely. The semiconductor metal oxide materials and composites thereof offer dual (reductive and oxidative) free radical generation for curing mechanisms, and the composites may be designed with molecular scaffolding. For example, supportive molecular structures such as carbon black, clay, and other additives can interact with semiconductor metal oxide materials and ethylenically unsaturated materials such as monomers, oligomers and prepolymers for more efficient curing reactions. Additionally, the composites may also interact with pigments to promote color properties as well as curing reactions. Composites modified with pigments can be added singularly to formulations and improve cure and color development. Further, the pigment-modified composites can be exposed to visible light to achieve improvement in color. Alternatively, semiconductor metal oxide materials and composites thereof may interact directly with semiconductor metal oxides, monomers, and pigments, without the need for supportive molecular scaffolding, to enhance cure and color directly.

In one aspect, the described semiconductor metal oxide materials and composites thereof include a semiconductor metal oxide defined in formula (I) as:

$$M_xO_yH_z \qquad \text{(I)}$$

wherein M is a metal selected from Ti, Zn, Mg, Ce, Bi, and Fe;
O is oxygen;
H is a halogen;
x is an integer of 1 to 3;
y is an integer of 1 to 3; and
z is an integer of 0 to 3.
Combinations of metal oxides as defined in formula (I) may be used.
Among the semiconductor metal oxide materials and composites thereof that may be included in the present actinic radiation curable compositions are photoactive nanocomposite anatase-$TiO_2$, ZnO, and other photocatalytic band gap semiconductors. These materials effect and/or augment cure and enhance the color of the cured compositions. Further, semiconductor metal oxide materials and composites thereof are demonstrated to increase the optical density and improve the 'jetness' of compositions containing black pigments, without experiencing decreased curing efficiency. Further, curing occurs effectively in a variety of actinic radiation curable compositions, including those containing lesser amounts of photoinitiator. The semiconductor metal oxide materials and composites thereof are less toxic and more stable than traditional photoinitiators. They can be stored over longer time periods, have better shelf-life and are more heat and light resistant than traditional photoinitiators. Further, the semiconductor metal oxide materials and composites thereof have been shown to work synergistically alone and as composites with certain additives such as carbon black.

Semiconductor metal oxide materials and composites thereof are more stable (i.e., do not degrade) and are less likely to migrate even after exposed to UV light, when compared to typical photoinitiator packages. Semiconductor metal oxide materials and composites thereof are further advantageous in that their photocatalytic properties involve dual photo-induced oxidative/reductive free radical curing pathways. An advantageous property possessed by band gap additives such as the semiconductor metal oxide materials are the dual oxidation/reductive free radical promoting pathways that they work along when aiding curing. A photocatalyst, such as a semiconductor metal oxide material, undergoes electronic excitation upon exposure to UV radiation from its valence band to its conduction band. This results in the simultaneous generation of a reducing-agent free electron and an oxidative hole that drive free radical curing reactions. In the process, the photocatalyst loses electronic excitation energy and gains a valence bond electron and is then ready for another UV excitation event. Thus, the photocatalyst does not degrade with UV light and may generate curing reactions multiple times. In addition, the presence of water or oxygen will not inhibit the curing activity of the metal oxide photoinitiator.

The stability and supramolecular adaptability of semiconductor metal oxide materials allow them to be combined into a variety of composites with varying UV absorbance or radiation enhancing activity. Notably, semiconductor metal oxides may also form supramolecular complexes and composites with pigments, enhancing color and cure.

Semiconductor metal oxide materials are semiconductors that may also act as radiation enhancers. That is, if these semiconductor materials are exposed to high energy subatomic particles, such as emitted by an electron beam, electron reduction into band gap/conduction band and Auger electron effects induce electron emission amplification, thereby causing the semiconductor metal oxides to act as radiation enhancers. Semiconductor metal oxide materials exposed to an electron beam will emit further electrons which increase free radical curing reactions.

The invention described herein makes use of semiconductor metal oxide materials and composites thereof that function as semiconductors, which share several advantages over conventional photoinitiator packages. Semiconductor metal oxide materials are not adversely affected by heat, unlike traditional photoinitiators. The semiconductor metal oxide materials may be utilized alone, or as composites within actinic radiation curable compositions. In all cases, the materials offer dual reduction/oxidation pathways that create monomer free radicals, which aid photochemical curing and are not affected by oxygen inhibition interactions. In addition, the chemical structure of semiconductor metal oxide materials offers opportunities to design and create non-covalent supramolecular scaffolding with a composite material such as carbon black that can adsorb reactive monomer/oligomer species near the semiconductor metal oxides photoactive surface, thereby enhancing reaction efficiency.

Some other advantages:

The semiconductor metal oxide materials and composites thereof provide renewable, sustainable, eco-friendly and do not photodegrade with use;

The semiconductor metal oxide materials and composites thereof are preferably solid state composites that are less likely to migrate and are suitable for food packaging;

The semiconductor metal oxide materials and composites thereof can be used as a replacement for all or part of the amount of traditional, more toxic photoinitiators that are included in actinic radiation curable compositions, thus lowering the amounts of the photoinitiators;

The semiconductor metal oxide materials and composites thereof can work synergistically with photoinitiators, and in combination therewith, to enhance UV curing effects;

The wavelength absorbance of the semiconductor metal oxide materials may be modified using a variety of composite additives;

The semiconductor metal oxide materials and composites thereof are compatible in a variety of actinic radiation curable compositions; and Actinically cured compositions including the semiconductor metal oxide materials and composites thereof provide improved chemical resistance, cure, color density and gloss.

Composites of the semiconductor metal oxide materials compositions of the present embodiment include the semiconductor metal oxide material and additives including, for example but not limited to: clays, such as halloysites and aluminosilicates; $H_2O$; carbon black; acrylate monomers; humic acid, humic acid polymers, dyes and pigments to enhance UV curing/color, and photoactive substances that are capable of responding to light or electromagnetic radiation, such as optical brighteners and photoinitiators.

The applicants have found that a $TiO_2$ pigment available under the trade name Altiris 550 and available from Huntsman is an effective semiconductor metal oxide material for use as a curing aid in an actinic radiation curable composition, such as an ink or coating compositions that will be cured by exposure to UV light. The inclusion of this semiconductor metal oxide material enables the reduction of the amount of traditional photoinitiators that would otherwise be included in an energy curable ink formulation. Further, the properties of the ink and coating compositions that includes this semiconductor metal oxide material is comparable to or is improved relative to ink and coating compositions that do not include same.

There are other advantages that flow from the inclusion of semiconductive $TiO_2$ metal oxide such as Altiris 550 in the present actinic radiation curable compositions. Among them are: reduced amounts of migratable components, due to the inclusion of a reduced amount of photoinitiator, a benefit of particular relevance for printing packaging for foods and other sensitive items (e.g., over-the-counter and prescription medicines); compatibility in hydrophobic and hydrophilic compositions; compliance with Nestle and Swiss ordinances, as well as regulatory schemes of other government agencies; and can be suitably included in inks and coatings applied by virtually all printing methods, e.g., flexo, litho, gravure, LED flexo, ink jet and screen inks products.

It should be understood that not all metal oxides are semiconductive and/or photocatalytic materials. Many metal oxides will not perform as semiconductors, and thus will not initiate a free-radical polymerization reaction when in the presence of an ethylenically unsaturated material and exposed to actinic radiation. For example, a DSC for such a system including an ethylenically unsaturated material (e.g., 1,6-HDDA) and a non-semiconductive metal oxide material or composite thereof (e.g., BGA1, described later herein, in which the semiconductive $TiO_2$ is replaced with a non-semiconductive $TiO_2$) would not show generation of heat of reaction, indicating that free radical polymerization has not occurred, which demonstrates that this particular $TiO_2$ is not a semiconductive metal oxide material.

Table 1 below identifies exemplary metal oxide materials that exhibit semiconductive and/or photocatalytic effect, additives that may be used to make composites of the semiconductor metal oxide materials, and exemplary composites of semiconductor metal oxide materials and additives. The information provided in Table 1 is exemplary and not limiting in any way.

While not wishing to be limited by numerical limitations, it is generally known that $TiO_2$ materials used as pigments in ink compositions, which do not display the semiconductive properties of semiconductive metal oxides as defined and described herein, have particle sizes of 250 nm or greater. On the other hand, $TiO_2$ materials having particle sizes of 1 nm to 200 nm, or 1 nm to 175 nm, or 1 nm to 150 nm, or 1 nm to 120 nm, have been found to be semiconductive. It should be noted that these numeric ranges does not necessarily apply universally, as for example, the Altiris 550 $TiO_2$ semiconductive metal oxide described herein is not believed to conform to this comment on particle size.

Composites of the semiconductor metal oxide materials may be particularly well suited for inclusion in the actinic radiation curable compositions described herein. As indicated above, the additives included in the composites may tune and adjust the band gap of the semiconductor metal oxide material, thereby providing maximized photocatalytic activity and the wavelengths of light used to cure the compositions. Among those materials are pigments, clays, humic acid, humic acid polymers, photoactive substances that are capable of responding to light or electromagnetic radiation, such as optical brighteners and photoinitiators.

In one aspect, the semiconductor metal oxide material is present as a composite of the semiconductor metal oxide material and a pigment selected from carbon black, halloysite clays, and aluminosilicate clays, magenta pigments such as lithol rubine pigments, and combinations thereof.

In one aspect, the semiconductor metal oxide material is present as a composite of the semiconductor metal oxide material and another composite forming material selected from carbon black, aluminosilicate clay, and combinations thereof.

As indicated, one advantage of the present invention is that the amount of photoinitiator can be lessened by the inclusion of the semiconductor metal oxide material and composites thereof. For example, it is has been found that the semiconductor metal oxide material and composites thereof can replace all or part of the photoinitiator typically included in the actinic radiation curable compositions on a 1 to 1 (w/w/) basis, based on the total weight of the composition.

In one aspect, the semiconductor metal oxide material (and/or composite thereof) is present in an amount of 0.1 wt % to 25 wt %, preferably 0.5 wt % to 20 wt %, more preferably 1.0 wt % to 10 wt %, based on the total weight of the composition.

Composites may be formed by mixing the components for a sufficient period of time on DAC speed mixers and/or on ultrasonic processors such as sonicators.

Polymerizable Component

In one aspect, the polymerizable component is present in the actinic radiation curable compositions in an amount of 10 wt % to 90 wt %, preferably 60 wt % to 90 wt %, more preferably 70 wt % to 90 wt %, based on the total weight of the composition.

Many different species of monofunctional and multifunctional ethylenically unsaturated materials may be used in the present actinic radiation curable compositions. A merely exemplary and non-exclusive list of same includes:

Monofunctional Ethylenically Unsaturated Monomers

Examples of suitable monofunctional ethylenically unsaturated monomers include but are not limited to the following:

isobutyl acrylate; cyclohexyl acrylate; iso-octyl acrylate; n-octyl acrylate; isodecyl acrylate; iso-nonyl acrylate; octyl/decyl acrylate; lauryl acrylate; 2-propyl heptyl acrylate; tridecyl acrylate; hexadecyl acrylate; stearyl acrylate; iso-stearyl acrylate; behenyl acrylate; tetrahydrofurfuryl acrylate; 4-t.butyl cyclohexyl acrylate; 3,3,5-trimethylcyclohexane acrylate; isobornyl acrylate; dicyclopentyl acrylate; dihydrodicyclopentadienyl acrylate; dicyclopentenyloxyethyl acrylate; dicyclopentanyl acrylate; benzyl acrylate; phenoxyethyl acrylate; 2-hydroxy-3-phenoxypropyl acrylate; alkoxylated nonylphenol acrylate; cumyl phenoxyethyl acrylate; cyclic trimethylolpropane formal acrylate; 2(2-ethoxyethoxy) ethyl acrylate; polyethylene glycol monoacrylate; polypropylene glycol monoacrylate; caprolactone acrylate; ethoxylated methoxy polyethylene glycol acrylate; methoxy triethylene glycol acrylate; tripropyleneglycol monomethyl ether acrylate; diethylenglycol butyl ether acrylate; alkoxylated tetrahydrofurfuryl acrylate; ethoxylated ethyl hexyl acrylate; alkoxylated phenol acrylate; ethoxylated phenol acrylate; ethoxylated nonyl phenol acrylate; propoxylated nonyl phenol acrylate; polyethylene glycol o-phenyl phenyl ether acrylate; ethoxylated p-cumyl phenol acrylate; ethoxylated nonyl phenol acrylate; alkoxylated lauryl acrylate; ethoxylated tristyrylphenol acrylate; N-(acryloyloxyethyl)hexahydrophthalimide; N-butyl 1,2 (acryloyloxy) ethyl carbamate; acryloyl oxyethyl hydrogen succinate; octoxypolyethylene glycol acrylate; octafluoropentyl acrylate; 2-isocyanato ethyl acrylate; acetoacetoxy ethyl acrylate; 2-methoxyethyl acrylate; dimethyl aminoethyl acrylate; 2-carboxyethyl acrylate; 4-hydroxy butyl acrylate, and combinations thereof. Methacrylate counterpart compounds to the above may also be included (e.g., isobutyl methacrylate to isobutyl acrylate), although those skilled in the art will appreciate that methacrylate compounds have lower reactivity than their equivalent acrylate counterparts.

Examples of suitable multifunctional ethylenically unsaturated monomers include but are not limited to the following: 1,3-butylene glycol diacrylate; 1,4-butanediol diacrylate; neopentyl glycol diacrylate; ethoxylated neopentyl glycol diacrylate; propoxylated neopentyl glycol diacrylate; 2-methyl-1,3-propanediyl ethoxy acrylate; 2-methyl-1,3-propanediol diacrylate; ethoxylated 2-methyl-1,3-propanediol diacrylate; 3 methyl 1,5-pentanediol diacrylate; 2-butyl-2-ethyl-1,3-propanediol diacrylate; 1,6-hexanediol diacrylate; alkoxylated hexanediol diacrylate; ethoxylated hexanediol diacrylate; propoxylated hexanediol diacrylate; 1,9-nonanediol diacrylate; 1,10 decanediol diacrylate; ethoxylated hexanediol diacrylate; alkoxylated hexanediol diacrylate; diethyleneglycol diacrylate; triethylene glycol diacrylate; tetraethylene glycol diacrylate; polyethylene glycol diacrylate; propoxylated ethylene glycol diacrylate; dipropylene glycol diacrylate; tripropyleneglycol diacrylate; polypropylene glycol diacrylate; poly (tetramethylene glycol) diacrylate; cyclohexane dimethanol diacrylate; ethoxylated cyclohexane dimethanol diacrylate; alkoxylated cyclohexane dimethanol diacrylate; polybutadiene diacrylate; hydroxypivalyl hydroxypivalate diacrylate; tricyclodecanedimethanol diacrylate; 1,4-butanediylbis[oxy(2-hydroxy-3,1-propanediyl)]diacrylate; ethoxylated bisphenol A diacrylate; propoxylated bisphenol A diacrylate; propoxylated ethoxylated bisphenol A diacrylate; ethoxylated bisphenol F diacrylate; 2-(2-vinyloxyethoxy)ethyl acrylate; dioxane glycol diacrylate; ethoxylated glycerol triacrylate; glycerol propoxylate triacrylate; pentaerythritol triacrylate; trimethylolpropane triacrylate; caprolactone modified trimethylol propane triacrylate; ethoxylated trimethylolpropane triacrylate; propoxylated trimethylol propane triacrylate; tris (2-hydroxy ethyl) isocyanurate triacrylate; e-caprolactone modified tris (2-hydroxy ethyl) isocyanurate triacrylate; melamine acrylate oligomer; pentaerythritol tetraacrylate; ethoxylated pentaerythritol tetraacrylate; di-trimethylolpropane tetra acrylate; dipentaerythritol pentaacrylate; dipentaerythritol hexaacrylate; ethoxylated dipentaerythritol hexaacrylate, and combinations thereof. Methacrylate counterpart compounds to the above may also be included (e.g., isobutyl methacrylate to isobutyl acrylate), although those skilled in the art will appreciate that methacrylate compounds have lower reactivity than their equivalent acrylate counterparts.

Other functional monomer species and classes capable of being used in part in these formulations include cyclic lactam such as N-vinyl caprolactam; N-vinyl oxazolidinone and N-vinyl pyrrolidone, and secondary or tertiary acrylamides such as acryloyl morpholine; diacetone acrylamide; N-methyl acrylamide; N-ethyl acrylamide; N-isopropyl acrylamide; N-t.butyl acrylamide; N-hexyl acrylamide; N-cyclohexyl acrylamide; N-octyl acrylamide; N-t.octyl acrylamide; N-dodecyl acrylamide; N-benzyl acrylamide; N-(hydroxymethyl)acrylamide; N-isobutoxymethyl acrylamide; N-butoxymethyl acrylamide; N,N-dimethyl acrylamide; N,N-diethyl acrylamide; N,N-propyl acrylamide; N,N-dibutyl acrylamide; N,N-dihexyl acrylamide; N,N-dimethylamino methyl acrylamide; N,N-dimethylamino ethyl acrylamide; N,N-dimethylamino propyl acrylamide; N,N-dimethylamino hexyl acrylamide; N,N-diethylamino methyl acrylamide; N,N-diethylamino ethyl acrylamide; N,N-diethylamino propyl acrylamide; N,N-dimethylamino hexyl acrylamide; and N,N'-methylenebisacrylamide.

Combinations of any of the above may be used in the present compositions.

Ethylenically Unsaturated Oligomers/Prepolymers

The at least one prepolymer consisting of an oligomer may preferably be selected from the group consisting of epoxy acrylates, acrylated oils, urethane acrylates (aliphatic and aromatic), polyester acrylates, polyether acrylates, vinyl/acrylic oligomers, polyene/thiol systems, and combinations thereof Photoinitiators The present compositions may include one or more photoinitiators. In one aspect, the photoinitiator component is present in the actinic radiation curable compositions in an amount of 2.0 wt % to 40 wt %, preferably 5.0 wt % to 25 wt %, more preferably 5.0 wt % to 20 wt %, based on the total weight of the composition. In a further aspect, this amount is less than the amount of photoinitiator provided in an actinic radiation curable composition that does not include the described semiconductor metal oxide material and composites thereof.

The semiconductor metal oxide materials and composites thereof have been found to work together with photoinitiators to provide a fast, thorough cure. Suitable photoinitiators include, but are not limited to, the following: α-hydroxyketones such as; 1-hydroxy-cyclohexyl-phenyl-ketone; 2-hydroxy-2-methyl-1-phenyl-1-propanone; 2-hydroxy-2-methyl-4'-tert-butyl-propiophenone; 2-hydroxy-4'-(2-hydroxyethoxy)-2-methyl-propiophenone; 2-hydroxy-4'-(2-hydroxypropoxy)-2-methyl-propiophenone; oligo 2-hydroxy-2-methyl-1-[4-(1-methyl-vinyl)phenyl]propanone; bis[4-(2-hydroxy-2-methylpropionyl)phenyl]methane; 2-Hydroxy-1-[1-[4-(2-hydroxy-2-methylpropanoyl)phenyl]-1,3,3-trimethylindan-5-yl]-2-methylpropan-1-one and 2-Hydroxy-1-[4-[4-(2-hydroxy-2-methylpropanoyl)phenoxy]phenyl]-2-methylpropan-1-one; acylphosphine oxides such as; 2,4,6-trimethylbenzoyl-diphenylphosphine oxide; ethyl (2,4,6-trimethylbenzoyl)phenyl phosphinate; and bis-(2,4,6-trimethylbenzoyl)-phenylphosphine oxide; α-aminoketones such as; 2-methyl-1-[4-methylthio)phenyl]-2-morpholinopropan-1-one; 2-benzyl-2-dimethyl-amino-1-(4-morpholinophenyl)-butan-1-one; and 2-dimethylamino-2-(4-methyl-benzyl)-1-(4-morpholin-4-yl-phenyl)-butan-1-one; thioxanthones such as; 2-4-diethylthioxanthone, isopropylthioxanthone, 2-chlorothioxanthone, and 1-chloro-4-propoxythioxanthone; benzophenones such as; such as benzophenone, 4-phenylbenzophenone, and 4-methylbenzophenone; methyl-2-benzoylbenzoate; 4-benzoyl-4-methyldiphenyl sulphide; 4-hydroxybenzophenone; 2,4,6-trimethyl benzophenone, 4,4-bis(diethylamino)benzophenone; benzophenone-2-carboxy(tetraethoxy)acrylate; 4-hydroxybenzophenone laurate and 1-[-4-[benzoylphenylsulpho]phenyl]-2-methyl-2-(4-methylphenylsulphonyl)propan-1-one; phenylglyoxylates such as; phenyl glyoxylic acid methyl ester; oxy-phenyl-acetic acid 2-[hydroxyl-ethoxy]-ethyl ester, or oxy-phenyl-acetic acid 2-[2-oxo-2-phenyl-acetoxy-ethoxy]-ethyl ester; oxime esters such as; 1-phenyl-1,2-propanedione-2-(O-ethoxycarbonyl)oxime; [1-(4-phenyl sulfanylbenzoyl)heptylideneamino]benzoate, or [1-[9-ethyl-6-(2-methylbenzoyl)carbazol-3-yl]-ethylideneamino]acetate; Examples of other suitable photoinitiators include diethoxy acetophenone; benzyl; benzyl dimethyl ketal; titanocen radical initiators such as titanium-bis(η 5-2,4-cyclopentadien-1-yl)-bis-[2,6-difluoro-3-(1H-pyrrol-1-yl) phenyl]; 9-fluorenone; camphorquinone; 2-ethyl anthraquinone; and the like.

Polymeric photoinitiators and sensitizers are also suitable, including, for example, polymeric aminobenzoates (GENOPOL AB-1 or AB-2 from RAHN, Omnipol ASA from IGM or Speedcure 7040 from Lambson), polymeric benzophenone derivatives (GENOPOL BP-1 or BP-2 from RAHN, Omnipol BP, Omnipol BP2702 or Omnipol 682 from IGM or Speedcure 7005 from Lambson), polymeric thioxanthone derivatives (GENOPOL TX-1 or TX-2 from RAHN, Omnipol TX from IGM or Speedcure 7010 from Lambson), polymeric aminoalkylphenones such as Omnipol 910 from IGM; polymeric benzoyl formate esters such as Omnipol 2712 from IGM; and the polymeric sensitizer Omnipol SZ from IGM.

Irgacure®TPO is (2,4,6-trimethylbenzoyldiphenylphosphine oxide). Irgacure®TPO-L is (2,4,6-trimethylbenzoylphenyl phosphinate). Omnirad®907 is (2-methyl-1[4-(methylthio)phenyl]-2-morpholinopropan-1-one).

Irgacure®TPO and Irgacure®TPO-L were previously known as Lucirin®TPO and Lucirin®TPO-L, respectively. Omnirad®907 was previously known as Irgacure®907.

Combinations of one or more photoinitiators may be included in the compositions.

Further, certain initiators are known to be toxic. The above-described semiconductive $TiO_2$ metal oxide material (among other semiconductor metal oxide materials) are potential replacements for photoinitiators such as Irgacure® 369 (2-benzyl-2-dimethylamino-1-(4-morpholinophenyl)-butanone-1), which is known to pose a risk to unborn children. In a preferred aspect of the present application, the actinic radiation curable compositions are free of Irgacure® 369.

Other Components

The actinic radiation curable compositions may include other components which perform one or more functions and/or provide one or more attributes to the compositions. Among them are:

Amine Synergists

An amine synergist may also be included in the formulation. Suitable examples include, but are not limited to, the following: Aromatic amines such as; 2-(dimethylamino) ethylbenzoate; N-phenyl glycine; benzoic acid, 4-(dimethylamino)-, 1,1'-[(methylimino)di-2,1-ethanediyl] ester; and simple alkyl esters of 4-(N,N-dimethylamino)benzoic acid, with ethyl, amyl, 2-butoxyethyl and 2-ethylhexyl esters being particularly preferred; other positional isomers of N,N-dimethylamino)benzoic acid esters are also suitable.

Others that may be included are, for example, aliphatic amines such as N-methyldiethanolamine, triethanolamine and tri-isopropanolamine; Aminoacrylates and amine modified polyether acrylates Ebecryl 80, Ebecryl 81, Ebecryl 83, Ebecryl 85, Ebecryl 880, Ebecryl LEO 10551, Ebecryl LEO 10552, Ebecryl LEO 10553, Ebecryl 7100, Ebecryl P115 and Ebecryl P116 available from ALLNEX; CN501, CN550, CN UVA421, CN3705, CN3715, CN3755, CN381 and CN386, all available from Sartomer; Genomer 5142, Genomer 5161, Genomer 5271 and Genomer 5275 from Rahn; Photomer 4771, Photomer 4967, Photomer 5006, Photomer 4775, Photomer 5662, Photomer 5850, Photomer 5930, and Photomer 4250 all available from IGM, Laromer LR8996, Laromer LR8869, Laromer LR8889, Laromer LR8997, Laromer PO 83F, Laromer PO 84F, Laromer PO 94F, Laromer PO 9067, Laromer PO 9103, Laromer PO 9106 and Laromer P077F, all available from BASF; Agisyn 701, Agisyn 702, Agisyn 703, NeoRad P-81 and NeoRad P-85 ex DSM-AGI. Combinations of any of the above may be included.

Colorants

Suitable colorants include, but are not limited, to organic or inorganic pigments and dyes. The dyes include but are not limited to fluorescent dyes, azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired.

The colorant employed in the present invention may be any FD&C or D&C pigment. Preferred FD&C pigments include FD&C Red No. 40, FD&C Yellow No. 5, FD&C Yellow No. 6 and FD&C Blue No. 1. Preferred D&C pigments include D&C Red No. 6, D&C Red No. 7, D&C Red No. 21, D&C Red No. 22, D&C Red No. 27, Red No. 28, D&C Red No. 30, D&C Red No. 33, D&C Red No. 34, D&C Red No. 36, D&C Orange No. 5 and D&C Yellow No. 10.

Optical Brighteners

The actinically curable composition may also include optical brighteners. Optical brighteners are known to be colorless or pale-colored organic compounds which absorb in the UV range and which reemit most of the absorbed UV light as blue fluorescent light having wavelengths of from 400 to 500 nm. Luminescence detectors emit UV light and can detect the resulting fluorescent light. Examples of suitable optical brighteners include distyrylbenzenes, distyrylbiphenyls, stilbene derivatives, such as divinylstilbenes, triazinylaminostilbenes, stilbenyl-2H-triazoles, stilbenyl-2H-naphtho[1,2-d]triazoles and bis(1,2,3-triazolyl)stilbenes, each of which may be further substituted. Further examples include benzoxazoles, stilbenylbenzoxazoles, bisbenzoxazoles, benzimidazole derivatives, pyrazoline derivatives or coumarin derivatives. Optical brighteners are commercially available, for example under the names Blankophor®, Tinopal® or Ultraphor®. Mixtures of different optical brighteners may also be used. The amount of optical brighteners used is usually from 1.0 wt % to 25% by weight, based on the total weight of the composition.

Waxes

The actinically curable composition may also include waxes such as but not limited to amide wax, erucamide wax, polypropylene wax, paraffin wax, polyethylene wax, TEFLON®, carnauba wax and the like. The wax may be a combination of said waxes. It is preferred that the wax be a blend of amide and erucamide waxes. The wax, if present, is in an amount of 0 wt % to 4.0 wt %. It is preferred that the wax be present in an amount from 0.1 wt % to 2.0 wt %.

Other Additives

As with most actinically curable composition, additives may be incorporated to enhance various properties. A partial list of such additives includes but is not limited to adhesion promoters, silicones, light stabilizers, de-gassing additives, ammonia, flow promoters, defoamers, antioxidants, stabilizers, surfactants, dispersants, plasticizers, rheological additives, waxes, silicones, etc.

Curing

The actinic radiation curable compositions of the present invention can be cured by exposure to light emitted by an actinic light source, such as for example visible light, such as sunlight, and UV-light, which may be provided by a high-voltage mercury bulb, a medium-voltage mercury bulb, a xenon bulb, a carbon arc lamp, a metal halide bulb, and a UV-LED light source. The compositions may also be cured by exposure to electron beam (EB) radiation.

The wavelength of the actinic irradiation applied to the compositions is preferably within a range of about 200 to 500 nm, more preferably about 250 to 390 nm. UV energy is preferably within a range of about 30 to 3,000 mJ/cm$^2$, and more preferably within a range of about 50 to 500 mJ/cm$^2$. In addition, the bulb or other source can be appropriately selected according to the absorption spectrum of the radiation curable composition. Moreover, the actinically curable composition of the present invention can be cured under inert conditions or as a laminated structure.

Commercially available EB-dryers include, for example, those from Energy Science, Inc. of Wilmington, Mass., or from Advanced Electron Beams Inc. (AEB) of Wilmington, Mass. The energy absorbed, also known as the dose, is measured in units of kilo-Grays (kGy), one kGy being equal to 1,000 Joules per kilogram. Typically, the electron beam dose should be within the range of 10 kGy to about 40 kGy for complete curing. With the radiation curable composition of the present invention preferably cured by a radiation dose of 20-30 kGy at an oxygen level of <200 ppm is usually sufficient to get a dry, solvent resistant ink.

The present invention has been described in detail, including the preferred embodiments thereof. However, it will be appreciated that those skilled in the art, upon consideration of the present disclosure, may make modifications and/or improvements on this invention that fall within the scope and spirit of the invention.

EXAMPLES

The following examples illustrate specific aspects of the present invention and are not intended to limit the scope thereof in any respect and should not be so construed.

TABLE 1

Semiconductor Metal Oxide Materials, Additives for Composites, and Composite Formulations

| ID | Grade | Source | Chemistry |
|---|---|---|---|
| | | Components | |
| Zn1 | NanoArc ® ZN-2605 | Nanophase Technologies Corporation | ZnO |
| Ti1 | P25 | Evonik (USA) | TiO$_2$ |
| AC | Darco | Sigma-Aldrich (USA) | Carbon black |
| Ti2 | Altiris 550 | Huntsman | TiO$_2$ |
| Bi1 | | Sigma-Aldrich (USA) | BiOCl |
| Bi2 | | Alfa Aesar (USA) | Bi$_2$O$_3$ |
| Mg1 | | Acros Organics (USA) | MgO |
| Fe1 | | Alfa Aesar (USA) | Fe$_2$O$_3$ |
| NT1 | Dragonite APA | Applied Minerals Inc. | Aluminosilicate clay nanotubes |

| Composites | Preparation | |
|---|---|---|
| BGA1 | TiO$_2$ and carbon black were suspended in water and sonicated for 2 hr. at 35° C. A color changed from gray to blue grey. The suspension was filtered and dried. | Ti1 and AC |

TABLE 1-continued

Semiconductor Metal Oxide Materials, Additives for Composites, and Composite Formulations

| | | |
|---|---|---|
| BGA2 | Ti1, AC, Bi1, Bi2, Mg1 and Zn1 | All materials were premixed (at equal weight % of each component), and water was added in a ratio of 0.2 ml of water for every gram of mixed BGA solid. The resulting paste was mixed in a DAC orbital mixer on high speed for 2 min. two times. The complex was then EB pretreated at 30 ppm oxygen at 50 kGy. |
| BGA3 | Ti1, Zn1 and NT1 | Ratio of 3% Ti1, 2% ZN1 and 1% NT1 (wt. %) were added to the ink and mixed on a DAC orbital mixer on high for 2 minutes (twice). |

Formulations: Actinic radiation curable inks and coating inks were prepared by mixing the component(s) from Table 1 into an ink or ink components listed in Table 2 using Flack Tek Inc.'s DAC 400 orbital mixer for 5 minutes at 1800 rpm.

TABLE 2

Testing Materials: Inks, Ink Components and Substrates

| ID | Material | Source |
|---|---|---|
| HDDA | 1,6-hexanediol diacrylate | Sigma/Aldrich (USA) |
| Black1 | SunCure Advance Process Black (FLAS9444530) UV lithographic ink | Sun Chemical Corp. |
| Black2 | SunCure LO/LE PRO Black (UV F Series E124900267) UV lithographic ink | Sun Chemical Corp. |
| Black3 | Plastuff Print Black Ink (FLYCV9344111) UV Dry Offset ink | Sun Chemical Corp. |
| Black4 | SunCure MaxD UV flexo black ink | Sun Chemical Corp. |
| Cyan1 | SunCure Advance Process Cyan (FLASV5444531) UV lithographic ink | Sun Chemical Corp. |
| Cyan2 | SunCure UV LED Process Cyan, (91540321) UV flexo ink | Sun Chemical Corp. |
| Magenta1 | SunBeam Magenta EB (FLYWB4444136) UV lithographic ink | Sun Chemical Corp. |
| UVC1 | UV flexo coating (RCSFV0343453) | Sun Chemical Corp. |
| Coated Leneta | Coated Leneta, Form 1A - Penopac | Leneta Company Inc., Mahwah NJ |
| Uncoated Leneta | Uncoated Leneta, Form N2A-3 | Leneta Company Inc., Mahwah NJ |
| SBS | Solid bleached sulphate (SBS) fiber grade of paperboard | Graphic Packaging International |
| White OPP | White Oriented Polypropylene film | Avery Dennison Corporation |
| PP Cup | Polypropylene cups lot ZTT21506CP1 | Berry Global Inc. |

Ink preparation: Inks were prepared using a Speed mixer (DAC 150 FVZ) @ 1 min. 18,000 RPM. 3-roll milling was used as needed and described.

Proofing: Offset and dry offset inks were proofed with a "Little Joe" proofer (Little Joe Industries of Hillsborough, N.J.) with a Warren #2, 0.3 mil wedge plate or using an IGT proofer, as specified. Flexo inks were proofed using a Harper QD Phantom flexo handproofer with a 500 line 3.0 BCM anilox roller. Flexo Examples 13-15 were proofed using a Harper Jr. handheld proofer with 800 (LPI) line per inch× 1.90 (BCM) billion cubic microns using QD proofing bed.

Curing: Curing with exposure to UV light is as described for each example. UV-LED cure was achieved at 100 meters/min on GEW UV LED Lab unit. EB cure was achieved on a Comet EB BEAM EB Lab-200 at 30 ppm oxygen and dose of 50 kGy at 100 ft/min.

Extent of Cure/Isopropanol Rub Test: Extent of cure was determined by counting the number of rubs (strokes) it takes a cotton tipped stick soaked in isopropanol to break through the ink and reveal the underlying substrate. The more rubs it takes to break through, the better the cure. IPA rubs were performed using a Puritan sterile cotton tipped applicator (swab) soaked in IPA and determined by counting the number of rubs (strokes) it takes to break through the ink and reveal the underlying substrate. The higher the number of rubs, the better the IPA rub resistance.

Adhesion and Cure: The adhesion of the ink to substrate (and cure) was determined by applying a 1 inch strip tape (either 3M's 600 & 610 tape) to the cured film by hand and then pulled quickly from the surface. The estimated % of ink removal is determined by eye. observed % of ink removal. The lower the % of ink removal, the better the tape adhesion, and the better the cure.

Color Measurements: Black was measured using 3 reflectance metrics (Carbon Blackness [My], Jetness [Mc], and Undertone [dM]). Blackness (My) is a measure of the degree of blackness directly related to the reflectance. Reflectance values are typically below 5% and can be below 1% for the best blacks. The bottom-of-scale standardization of the instrument sets a measured reference for 0%. Where, blackness $My=100*\log(Yn/Y)$.

Jetness (Mc) is the color dependent black value developed by Lippok-Lohmer (Lippok-Lohmer, K., 1986, *Farbe und Lack*, 92 11, 1024-1029). As the Mc value increases, the jetness of the masstone increases. Sample preparation is typically based on an opaque drawdown of a black masstone based on black pigment and binder. Where, jetness $Mc=100*[\log(Xn/X)-\log(Zn/Z)+\log(Yn/Y)]$. The test sample is typically measured with a directional 45/0 instrument geometry, and $Xn=94.811$, $Yn=100.000$, $Zn=107.304$ are the CIE White Point values for D65/10 conditions. X, Y, Z are the CIE tristimulus values for the sample being measured Undertone (dM) quantifies how neutral the black pigment+binder is. As $Mc=dM+My$ Where, undertone $dM=Mc-My$ If $dM<0$, the undertone is brown-reddish.

A dM value=0 would suggest the black is perfectly achromatic or neutral.

If $dM>0$, then the black exhibits a bluish undertone which is often preferred.

Alternatively, CIELAB color space may also be implemented. The Lab color space is used when graphics for print have to be converted from RGB to CMYK, as the Lab gamut includes both the RGB and CMYK gamut. Also, it is used as an interchange format between different devices as for its device independency. The space itself is a three-dimensional real number space, which contains an infinite number of possible representations of colors.

However, in practice, the space is usually mapped onto a three-dimensional integer space for device-independent digital representation, and for these reasons, the L*, a*, and b* values are usually absolute, with a pre-defined range. The lightness, L*, represents the darkest black at L*=0, and the brightest white at L*=100. The color channels, a* and b*, will represent true neutral gray values at a*=0 and b*=0. The red/green opponent colors are represented along the a* axis, with green at negative a* values and red at positive a* values. The yellow/blue opponent colors are represented along the b* axis, with blue at negative b* values (so that relative values of b that decrease mean a bluer undertone), and yellow at positive b* values. The scaling and limits of the a* and b* axes will depend on the specific implementation of Lab color. Color measurements and color density readings were taken using a SpectroEye, 45:0 spectrodensitometer and the Color iControl program.

Gloss: Measurements were taken using a BYK Gardner micro-TRI-gloss meter at a 60° reflectance angle. Gloss is an aspect of the visual perception of objects (i.e. the attribute that causes them to have shiny, metallic or matte appearances). This angle is also the universal measurement angle.

Unless indicated otherwise, all amounts are wt %, based on total composition weights.

Inventive Example 1

BGA1 described in Table 1 above was added to HDDA at 1% wt. UV pulses were emitted at 0.5 s intervals at wavelengths between 325 nm to 500 nm. A photo-DSC spectrum (TA Instruments, Q2000) was generated and is the FIGURE. As shown, a distinctive heat signature was observed (top curve, the FIGURE) as the HDDA underwent UV-free radical photochemical polymerization in the presence of the semiconductor $TiO_2$ metal oxide. In contrast, no heat signature is seen when HDDA is exposed to UV light without the semiconductor material being present (lower curve, FIG. 1). This evidences that a polymerization reaction occurs with BGA1 composite, with bonds being created and heat being released.

Inventive Example 2

0.5% BGA1 in Cyan1 was proofed with the Little Joe on three substrates and UV cured with an Hg UV lamp at 100 fpm, 200 W/inch and 200 $mJ/cm^2$.

TABLE 3

Improved UV Cure with 0.5% BGA1 in Cyan1 as Indicated by IPA Rubs

| Substrate | Cyan1 (Comparative) - IPA Rubs | Ex. 2 (Inventive) - IPA Rubs |
|---|---|---|
| Coated Leneta | 3 | 6 |
| Uncoated Leneta | 4 | 7 |
| SBS | 4 | 7.5 |

Table 3 shows that the addition of 0.5% BGA1 to Cyan1 ink leads to an improvement in the cure of the ink, as indicated by the increase in IPA rubs relative to the ink not containing BGA1. It can be seen that the addition of 0.5% BGA1 increased the IPA rubs by almost twofold.

Inventive Example 3

The photoinitiator content in Black 1 was reduced by 10%, and then 3% Zn1 was added to Black1, which was proofed with a "Little Joe" on SBS and UV cured with an Hg UV lamp at 100 fpm, 200 W/inch and 200 $mJ/cm^2$. Black 1 without the addition of Zn1 was proofed and cured in the same manner to provide a comparison. The photoinitiator concentration was reduced by 10% from Black1. Table 4 includes the test results.

TABLE 4

Reduced Photoinitiator with Equal UV Cure using 3% Zn1 in Black1

| | Black1 (Comparative) | Ex. 3 (Inventive) |
|---|---|---|
| Photoinitiator | Std | Reduced by 10% |
| Blackness (My) | 154 | 180 |
| Jetness (Mc) | 149 | 174 |
| 60° Gloss | 23 | 29 |
| IPA Rubs | 1.2 | 2.5 |

The results in Table 4 are averages calculated from 3 measurements from each print, with a total of 3 prints. As shown in Table 4, the addition of 3% semiconductive ZnO metal oxide increased the avg. blackness (My), jetness (Mc) and gloss of the Inventive UV black lithographic ink of Example 3 in which photoinitiator has been reduced by 10%. Further, inventive Example 3 was more thoroughly and completely cured relative to the comparative Black 1.

The above demonstrates that the inclusion of semiconductor metal oxide materials enhances the color of the cured inks, and further, that the inclusion does not adversely affect the cure (in fact, the cure is superior). Of note is that with the reduction of photoinitiator in Black1 and replacement of same with Zn1, the color, gloss and number of IPA rubs are superior to the corresponding comparative example. Further, 1 part of Zn1 (1 part) replaces 3.33 parts of photoinitiator, showing that the replacement amounts of semiconductor metal oxide for photoinitiator can exceed more than a 1 for 1 exchange of parts.

The inclusion of the semiconductor metal oxide material in an actinic radiation curable ink appears to generate additional free radical curing reactions on exposure to UV light, enhancing cure. Normally, increases in density in black inks suffer a reduction in cure. Zn1 increased the density of the ink and increased the IPA rubs and therefore an increase in cure and color was demonstrated.

Inventive Example 4

9.5% of semiconductive Zn1 metal oxide was added to Black1 was proofed with a "Little Joe" on SBS board and UV cured. Prints were passed under the UV cure unit with a Hg UV lamp at 100 fpm, 200 W/inch and 200 mJ/cm² once and twice to simulate light levels the ink would be exposed to on a commercial press where interstation curing is used. Under these conditions, the inks would see multiple exposures to the UV curing units. Black 1 without the addition of Zn1 was proofed and cured in the same manner to provide a comparison.

TABLE 5

Improved UV Cure with 9.5% Zn1 in Black1

|  | Black1 (Comparative) | Ex. 4 (Inventive) |
|---|---|---|
| Blackness (My) | 185 | 197 |
| Jetness (Mc) | 182 | 196 |
| 60° Gloss | 32 | 35 |
| IPA Rubs - 1$^{st}$ UV Exposure | 1 | 5 |
| IPA Rubs - 2$^{nd}$ UV Exposure | 3 | 11 |

As shown in Table 5, the addition of 9.5% of semiconductive ZnO metal oxide to the inventive ink increases the optical properties, such as blackness, jetness and gloss and the cure is greatly enhanced, relative to the comparative Black 1 that does not include the of semiconductive ZnO metal oxide and which includes the full amount of photoinitiator.

Notably, the addition of the semiconductor metal oxide to inventive example 4 reduced the pigment loading thereof. The demonstrated improvement in color properties and gloss despite containing a lower proportion of pigment is a surprising result.

Results are averages calculated from 3 measurements from each print, with a total of 3 prints. Table 5 shows that the inclusion of semiconductor metal oxide materials can dramatically increase the cure while improving blackness, jetness and gloss. After one UV exposure the cure improved from 1 to 5 IPA rubs. After the second UV exposure, the cure improved from 3 to 11. Example 4 demonstrates that the inclusion of a semiconductor metal oxide material interacts with a pigment to create color enhancement and at the same time promote photopolymerization curing reactions.

Inventive Example 5

5% BGA2 was added to Magenta1 EB lithographic ink was proofed on SBS using a Little Joe and cured by EB at 30 ppm oxygen and dose of 50 kGy. Magenta1 was proofed onto SBS and cured to provide a comparison.

TABLE 6

Improved EB Cure with 5% BGA2 in Magenta1

|  | Magenta1 (Comparative) | Ex. 5 (Inventive) |
|---|---|---|
| L* | 47.8 | 47.1 |
| a* | 72.3 | 75.8 |
| b* | 9.5 | 5.9 |
| 60° Gloss | 12.9 | 24.5 |
| IPA Rubs | 6 | 44 |

Table 6 shows that the inclusion of the BGA2 composite (semiconductive $TiO_2$, carbon black, semiconductive BiOCl, semiconductive $Bi_2O_3$, and semiconductive MgO in equal parts) was both a cure- and color-enhancer for an electron beam (EB) based ink that does not include photoinitiator.

Results are averages calculated from 3 measurements from each print, with a total of 3 prints. BGA2 was formed by combining $TiO_2$, carbon black, BiOCl, $Bi_2O_3$, MgO and ZnO and EB pretreated by passing the composite into the EB Unit at 30 ppm $O_2$ at 50 kGy, 24 hr. prior to inclusion into the ink.

The addition of 5% BGA2 to Magenta EB lithographic ink, results in an increase in the density, and the magenta is bluer (the b* value is lowered, giving a bluer undertone), and the cured ink is glossier, all relative to the comparative ink. In addition to the improved visual properties, there is a significant increase IPA rubs, (6 to 44), which is indicative of a deeper and more thorough cure. This demonstrates that the composite interacts with the pigment to cause color enhancement and increase the degree of free radical polymerization curing.

Notably, the addition of the BGA 2 semiconductor metal oxide composite to inventive example 5 reduced the pigment loading thereof. The demonstrated improvement in color properties and gloss despite containing a lower proportion of pigment is a surprising result.

Inventive Example 6

2.5% semiconductive ZnO (Zn1) was added to Black2, a UV-curable flexographic ink was proofed onto white oriented polypropylene films (OPP) film and cured with an Hg UV lamp at 100 fpm, 200 W/inch and 200 mJ/cm². Black2 was proofed onto OPP and cured to provide a comparison.

TABLE 7

Improved Color Density with 2.5% Zn1 in Black2

|  | Black2 (Comparative) | Ex. 6 (Inventive) |
|---|---|---|
| Blackness (My) | 177 | 183 |
| Jetness (Mc) | 164 | 171 |
| 60° Gloss | 49 | 60 |
| IPA Rubs | 1.50 | 1.50 |

Table 7 shows that the inclusion of 2.5% Zn1 in an ultraviolet (UV) curable ink enhances the color of the cured ink, and visually apparent increase in blackness/jetness and gloss occurs in Example 6, all relative to comparative Black2. This is an example of a semiconductor metal oxide material interacting with pigments present in the ink and creating color enhancing effects.

Notably, the addition of the Zn1 to inventive example 6 reduced the pigment loading thereof. The demonstrated improvement in color properties and gloss despite containing a lower proportion of pigment is a surprising result.

Inventive Example 7: BGA3 in Black3 Dry Offset Inks on Polypropylene (PP)

6% BGA3 (semiconductive TiO2, semiconductive ZnO, and aluminosilicate clay nanotubes) was added to Black3 and three rolled milled. A PP plastic cup was cut into a flat sheet and corona treated using two passes under an Enercon by passing the substrate through the unit two times at 26 fpm and 0.42 kW. Inks were proofed onto the PP using an IGT proofer and cured at 400 watts per inch (wpi) at 200 fpm. Black3 was proofed onto the same PP substrate and cured to provide a comparison.

TABLE 8

Improved Cure with 6% BGA3 in Black3

|  | Black3 (Comparative) | Ex. 7 (Inventive) |
|---|---|---|
| IPA Rubs | 18 | 46 |
| Density | 1.65 | 1.70 |

Results are averages calculated from 3 measurements from each print, with a total of 3 prints. As shown in Table 8, the inclusion of BGA3 more than doubles the IPA rubs, indicating a significant improvement in cure. Color density increased as well. This shows that complexes of semiconductor metal oxides and clay nanotubes can combine to greatly improve the cure of UV inks.

Inventive Example 8: BGA3 in Irgacure 369 Free Vs. Black3 Dry Offset Inks on PP 2.4% Irgacure 369 was removed from Black3 and then 2.4% BGA3 was added to the ink and mixed into the ink using a DAC mixer. A PP plastic cup was cut into a flat sheet and corona treated in two passes under an Enercon by passing the substrate through the unit two times at 26 fpm and 0.42 kW. Inks were proofed onto the PP using an IGT and cured at 400 wpi at 200 fpm. For comparison, the Black3 ink containing 2.4% Irgacure 369 was proofed onto the same PP substrate and cured to provide a comparison.

TABLE 9

Irgacure 369 free inks with 2.4% BGA3 vs. UV Black3

|  | Black 3 (Comparative) | Ex. 8 (Inventive) |
|---|---|---|
| IPA Rubs | 12 | 16 |
| Density | 1.78 | 1.77 |

Results are averages calculated from 3 measurements from each print, with a total of 3 prints. As shown in Table 9, the Irgacure 369-free ink exhibited superior cure and comparable density. This demonstrates that the inventive composites significantly improve the cure of UV inks while advantageously eliminating undesirable photoinitiators. Irgacure 369 cannot be used in food packaging inks because it very toxic to aquatic life. Studies showing that it is suspected of damaging fertility and harming the unborn.

Inventive Example 9: BGA3 in Irgacure 369 Free Vs. UV Flexo Black4 on PET

UV Flexo Black4 includes 5% Irgacure 369. In inventive example 9, 5% Irgacure 369 was replaced with 5% of BGA3 in UV Flexo Black4. Example 9 was proofed using a Harper flexo handproofer onto corona treated PET film with a 700 lpi, 2.2 bcm anilox, and cured at 400 wpi and 300 fpm belt speed. The prints were passed through the cure unit multiple times which replicates what the ink would see on press where the ink/substrate passes under a UV lamp after each print unit. For comparison, the Black4 containing 5% Irgacure 369 was proofed onto the same PET substrate and cured to provide a comparison.

TABLE 10

IPA Rubs of Irgacure 369 free inks vs. 5% BGA3 in Black3

|  | Black 4 (Comparative) | Ex. 9 (Inventive) |
|---|---|---|
| One UV Pass | 11 | 13 |
| Two UV Passes | 36 | 70 |

With inventive Example 9, multiple exposure (i.e., 2 UV passes) to the UV energy emitted by the lamps formed cured printed articles exhibiting significantly improved cure, as indicated by the increase in the number of IPA rubs required for removal, relative to Black4. Again, the elimination of Irgacure 369 provides significant benefits.

Inventive Example 10: BGA1 in UV LED vs. Cyan2 on PET

A BGA1 dispersion of 50% in ethoxylated trimethylolpropane triacrylate (EOTMPTA) was prepared by mixing in a DAC mixer. 5% of this mixture was added to Cyan2 ink and mixed in a DAC mixer. The ink was proofed using a Harper flexo handproofer onto corona treated PET film with a 700 lpi, 2.2 bcm anilox, and cured at 100 fpm with a UV LED cure unit. Cyan2 was proofed onto the same PET substrate and cured to provide a comparison.

TABLE 11

Cyan2 UV LED Flexo with 5% BGA1

|  | Cyan2 (Comparative) | Ex. 10 (Inventive) |
|---|---|---|
| IPA Rubs | 11 | 100+ |

Inventive Example 11: UV Cure of 5% BGA1 or Bi2 in EOTMPTA

5% BGA1 was added to EOTMPTA. Visible light pulses were emitted at 1.0 s intervals, 5% light intensity for 10 cycles, between 400 nm-500 nm and a photo-DSC heat emission was measured (TA Instruments, Q2000). The heat signature for the pan and EOTMPTA were subtracted and the areas under the curves summed together. The units of mW/g is related to the enthalpy of reaction as bonds are formed, also known as heat of curing. The above procedure was repeated with 5% Bi2 (Bi2O3) replacing the 5% BGA1. Results are given in Table 12.

TABLE 12

Enthalpy of Reaction of BGA1 and Bi2 in EOTMPTA

| Cycle | 5% BGA1 in EOTMPTA mW/g | 5% Bi2 in EOTMPTA mW/g |
|---|---|---|
| 1 | 45 | 43 |
| 2 | 30 | 32 |
| 3 | 27 | 28 |
| 4 | 26 | 28 |
| 5 | 34 | 32 |
| 6 | 29 | 29 |
| 7 | 25 | 24 |
| 8 | 34 | 31 |
| 9 | 29 | 26 |
| 10 | 24 | 23 |

Distinctive heat signatures for each mixture were observed under visible light, indicating free radical photochemical polymerization curing reactions have occurred between the monomers in the presence of the semiconductive metal oxide materials and the composite. This demonstrates that a reaction is initiated in the monomers in the presence of BGA1 and Bi2 with visible light exposure. The enthalpy of reaction values show that bonds are created and heat is released, with no photoinitiators being present. This shows that semiconductor metal oxides are capable of initiating photopolymerization without the need for a photoinitiator.

Example 12 (Prophetic): Semiconductor Metal Oxide in Adhesive

UV-curable adhesive compositions are formulated with materials comparable to those used to make inks and coatings. Based on results presented, improvement in cure should be possible if semiconductor metal oxide materials are added to the existing photoinitiator package to increase or some photoinitiators are replaced while maintaining cure.

TABLE 13

Photoinitiator Compound Formulation (82% photoinitiator)

| Material | Amount |
|---|---|
| Inhibitor (2.2 Dihydroxy-4-methoxybenzophenone) | 2.0 |
| propoxylated neopentyl glycol diacrylate (PONPGDA) | 9.0 |
| PPTTAA (Alkoxylated Pentaerythritol Tetraacrylate) monomer | 7.0 |
| Irgacure 369 (BASF) photoinitiator | 15.0 |
| Irgacure 819 (BASF) photoinitiator | 7.0 |
| ethyl 4-dimethylaminobenzoate (EDB) photoinitiator | 16.0 |
| Chivacure 70 (Chitec) photoinitiator | 32.0 |
| Esacure 1 (IGM) photoinitiator | 12.0 |
| Total | 100.0 |

TABLE 14

Photoinitiator-Semiconductor Metal Oxide Material Compound Formulation (64.5% photoinitiator):

| | | |
|---|---|---|
| $TiO_2$ | Atiris 550 | 10.0 |
| ZnO | Zinc oxide | 10.0 |
| | PPTTAA monomer | 15.0 |
| | Thioxanthone photoinitiator | 25.0 |
| | Irgacure 819 (BASF) photoinitiator | 8.0 |
| | TPO-L photoinitiator | 31.5 |
| | Optiblanc PL (optical brightener) | 0.5 |
| | Total | 100.0 |

Ti2 and Zn1 were formulated into a photoinitiator compound (Table 14). Irgacure 369 was eliminated and the overall concentration of photoinitiators was reduced from 85% to under 64%. UV Flexo inks were made by mixing the photoinitiator compounds in Table 13 and Table 14 with Sun Chemical's cyan base (Table 15, yellow base (Table 16) and lithol rubine base (Table 17) and PPTTAA monomer with a Speed Mixer DAC 150 FVZ at 1 min at 18,000 rpm.

TABLE 15

Cyan Flexo Ink Examples 13 (Comparative) & 13A (Inventive)

| Material | Ex. 13 (Comp) | Ex. 13A (Inv.) |
|---|---|---|
| UV cyan flexo base (Sun Chemical) | 50 | 50 |
| PPTTAA | 25 | 25 |
| Table 13 Photoinitiator Compound | 25 | 0 |
| Table 14 Photoinitiator Compound with Semiconductor metal oxide | 0 | 25 |
| Total | 100 | 100 |

TABLE 16

Yellow Flexo Ink Examples 14 (Comparative) & 14A (Inventive)

| Material | Ex. 14 (Comp) | Ex. 14A (Inv.) |
|---|---|---|
| UV Yellow flexo base (Sun Chemical) | 50 | 50 |
| PPTTAA | 25 | 25 |
| Table 13 Photoinitiator Compound | 25 | 0 |
| Table 14 Photoinitiator Compound with Semiconductor metal oxide | 0 | 25 |
| Total | 100 | 100 |

TABLE 17

Rubine Flexo Ink Examples 15 (Comparative) & 15A (Inventive)

| Material | Ex. 15 (Comp) | Ex. 15A (Inv.) |
|---|---|---|
| UV Rubine flexo base (Sun Chemical) | 50 | 50 |
| PPTTAA | 25 | 25 |
| Table 13 Photoinitiator Compound | 25 | 0 |
| Table 14 Photoinitiator Compound with Semiconductor metal oxide | 0 | 25 |
| Total | 100 | 100 |

For all sets of ink examples (15/15A; 16/16A; 17/17A) viscosity measurements were taken using an TA Instruments Rheolyst cone & plate rheometer equipped with a 4 cm, 2° steel cone at 25° C. in a strain sweep test and found to be equivalent (±10%) between the Inventive and Comparative Examples for each of the 3 sets of inks. Inks were proofed onto an acrylic coated PET film using a Harper Jr. handheld proofer with 800 (LPI) line per inch×1.90 (BCM) billion cubic microns using QD proofing bed and cured using an American Ultraviolet UV processor curing unit with a 12-inch width conveyor with belt speeds of 300 (FPM) feet per minute, 400 (WPI) watts per inch 12-inch Hg bulb (mercury vapor pressure) lamp.

TABLE 18

Test Results for Examples 13-15 on Untreated Acrylic coated PET film

| Example | Tape adhesion 600 | Tape adhesion 610 | IPA rubs | Color density |
|---|---|---|---|---|
| Ex. 14 UV flexo free radical yellow ink | 0% | 25% | 25 | 0.87 |
| Ex. 14A UV flexo free radical band gap yellow ink | 0% | 100% | 25 | 0.90 |
| Ex. 15 UV flexo free radical rubine ink | 0% | 0% | 42 | 2.26 |

TABLE 18-continued

Test Results for Examples 13-15 on
Untreated Acrylic coated PET film

| Example | Tape adhesion 600 | Tape adhesion 610 | IPA rubs | Color density |
|---|---|---|---|---|
| Ex. 15A UV flexo free radical band gap rubine ink | 0% | 100% | 50 | 2.27 |
| Ex. 13 UV flexo free radical cyan ink | 0% | 0% | 1 | 1.54 |
| Ex. 13 A UV flexo free radical band gap cyan ink | 0% | 100% | 34 | 1.59 |

The results shown in Table 18 illustrate that the use of Altiris 550 (TiO$_2$) and zinc oxide as semiconductor metal oxide materials in UV flexo Hg curable inks of inventive examples 13A, 14A, and 15A exhibit comparable or better IPA resistance results, superior tape adhesion results (cure) and improved color density. Notably, the inventive examples achieve these results while being free of the toxic IRGACURE® 369. Further, the total amount of photoinitiator was reduced in the inventive example.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A composition curable by exposure to actinic radiation comprising a polymerizable component selected from an ethylenically unsaturated monomer, an ethylenically unsaturated oligomer, an ethylenically unsaturated prepolymer, and combinations thereof; and
    a photocatalytic material comprising a semiconductor metal oxide material, optionally present as a composite comprising the semiconductor metal oxide material or a mixture of semiconductor metal oxide materials, and another composite forming material,
    wherein the semiconductor metal oxide component upon exposure to a reaction-starting dose of actinic radiation creates a free radical polymerization reaction pathway in the polymerizable, ethylenically unsaturated component without loss of the semiconductor metal oxide, wherein the semiconductor metal oxide materials and composites thereof can interact directly the monomers, oligomers or polymers.

2. The composition of claim 1, wherein the semiconductor metal oxide is as defined in formula (I):

$$M_xO_yH_z \quad (I)$$

wherein M is a metal selected from Ti, Zn, Mg, Ce, Bi, and Fe;
    O is oxygen;
    H is a halogen;
    x is an integer of 1 to 3;
    y is an integer of 1 to 3; and
    z is an integer of 0 to 3.

3. The composition of claim 1, wherein the semiconductor metal oxide is present as a composite, and the another composite forming material is selected from pigments, clays, humic acid, humic acid polymers or optical brighteners.

4. The composition of claim 3, wherein the pigments are selected from carbon black, halloysite clays, and aluminosilicate clays, lithol rubines or combinations thereof.

5. The composition of claim 1, wherein the semiconductor metal oxide material is present as a composite, and another composite forming material of the composite comprises a material selected from carbon black, aluminosilicate clays, or combinations thereof.

6. The composition of claim 1, wherein the semiconductor metal oxide material is present as a composite selected from: a composite comprising semiconductive TiO$_2$ and carbon black; a composite comprising semiconductive TiO2, semiconductive BiOCl, semiconductive Bi$_2$O$_3$, and semiconductive MgO, and carbon black; a composite comprising semiconductive TiO2, semiconductive ZnO, and aluminosilicate clay.

7. The composition of claim 1, wherein the polymerizable component comprises an ethylenically unsaturated monomer selected from monofunctional ethylenically unsaturated monomers and multifunctional ethylenically unsaturated monomers.

8. The composition of claim 1, wherein the polymerizable component is present in an amount of 10 wt % to 90 wt %.

9. The composition of claim 1, wherein the polymerizable component comprises an ethylenically unsaturated prepolymer.

10. The composition of claim 1, wherein the polymerizable component comprises an ethylenically unsaturated monomer and an ethylenically unsaturated prepolymer.

11. The composition of claim 1, wherein the polymerizable component comprises an ethylenically unsaturated prepolymer selected from epoxyacrylates, acrylated oils, aliphatic urethane acrylates, aromatic urethane acrylates, polyester acrylates, polyether acrylates, vinyl/acrylic oligomers, polyene/thiol systems, or combinations thereof.

12. The composition of claim 1, wherein the actinically curable composition is a printing ink, coating, adhesive or primer composition.

13. The composition of claim 1, further comprising a colorant.

14. The composition of claim 13, wherein the colorant comprises a pigment.

15. The composition of claim 1, wherein the semiconductor metal oxide material or composite thereof is present in an amount of 0.1 wt % to 25 wt %.

16. The composition of claim 1, further comprising a photoinitiator component comprising one or more photoinitiators.

17. The composition of claim 16, wherein the photoinitiator component is present in an amount 2.0 wt % to 40 wt %.

18. The composition of claim 1, wherein the composition does not include a photoinitiator selected from 2-benzyl-2-dimethylamino-1-(4-morpholinophenyl)-butanone-1.

19. The composition of claim 1, wherein the composition is selected from an ink, a coating, a varnish, or an adhesive.

20. A method of improving one or more of cure, color, or color density in an actinic radiation curable composition, comprising the steps of providing a printed substrate by printing the composition of claim 1 onto a substrate and curing the printed substrate with actinic radiation.

21. The method of claim 20, wherein the composition further comprises a photoinitiator component comprising one or more photoinitiators.

22. A printed article comprising a substrate printed with the composition of claim 1.

23. The printed article of claim 22, wherein the substrate is selected from plastics, cellulosics, paper, paperboard or metal.

24. The printed article of claim 22, wherein the substrate is selected from a packaging article, a metal panel, or an electronic article.

25. A composition curable by exposure to actinic radiation comprising a polymerizable component selected from an ethylenically unsaturated monomer, an ethylenically unsaturated oligomer, an ethylenically unsaturated prepolymer, and combinations thereof; and
- a photocatalytic material comprising a semiconductor metal oxide material, present as a composite comprising the semiconductor metal oxide photocatalytic material or a mixture of semiconductor metal oxide materials, and another composite forming material comprising a material selected from carbon black, aluminosilicate clays, or combinations thereof,
wherein the semiconductor metal oxide upon exposure to a reaction-starting dose of actinic radiation creates a free radical polymerization reaction pathway in the polymerizable, ethylenically unsaturated component without loss of the semiconductor metal oxide during the photopolymerization process, wherein the semiconductor metal oxide materials and composites thereof can interact directly with the monomers, oligomers or polymers.

26. The composition of claim 25, wherein semiconductor metal oxide photocatalytic material or mixture of semiconductor metal oxide materials comprise $ZnO$, $TiO_2$, $BiOCl$, $Bi2O_3$, $MgO$ or $Fe_2O_3$.

\* \* \* \* \*